United States Patent
Kim et al.

(10) Patent No.: US 9,298,071 B2
(45) Date of Patent: *Mar. 29, 2016

(54) MULTI-PROJECTION SYSTEM

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 398 days.

This patent is subject to a terminal disclaimer.

(21) Appl. No.: 13/934,508

(22) Filed: Jul. 3, 2013

(65) Prior Publication Data

US 2014/0016100 A1    Jan. 16, 2014

(30) Foreign Application Priority Data

Jul. 12, 2012  (KR) .................. 10-2012-0076100
Nov. 16, 2012  (KR) .................. 10-2012-0130108

(51) Int. Cl.
| | |
|---|---|
| G03B 21/26 | (2006.01) |
| G03B 21/13 | (2006.01) |
| E04H 3/22 | (2006.01) |
| G03B 21/00 | (2006.01) |
| G03B 21/56 | (2006.01) |
| H04N 9/31 | (2006.01) |
| G03B 37/04 | (2006.01) |

(52) U.S. Cl.
CPC ........ G03B 21/13 (2013.01); E04H 3/22 (2013.01); G03B 21/00 (2013.01); G03B 21/56 (2013.01); G03B 37/04 (2013.01); H04N 9/3147 (2013.01)

(58) Field of Classification Search
CPC ...... G03B 21/13; G03B 21/26; H04N 9/3147; H04N 9/3197; H04N 9/3188
USPC .............. 353/30, 69–70, 94; 348/743–747
See application file for complete search history.

(56) References Cited

U.S. PATENT DOCUMENTS

| | | | |
|---|---|---|---|
| 9,039,194 B2* | 5/2015 | Tannhauser | H04N 9/3147 |
| | | | 345/634 |
| 2002/0105623 A1 | 8/2002 | Pinhanez | |
| 2004/0150795 A1 | 8/2004 | Ishii et al. | |
| 2005/0052623 A1 | 3/2005 | Hsiung | |
| 2005/0195373 A1 | 9/2005 | Feigel et al. | |
| 2007/0139627 A1* | 6/2007 | Yamada | G03B 21/13 |
| | | | 353/94 |

(Continued)

FOREIGN PATENT DOCUMENTS

| | | |
|---|---|---|
| DE | 10021981 A1 | 12/2001 |
| EP | 0514045 A1 | 11/1992 |

(Continued)

OTHER PUBLICATIONS

International Search Report for International Application No. PCT/KR2013/006143.

(Continued)

*Primary Examiner* — Sultan Chowdhury
(74) *Attorney, Agent, or Firm* — LRK Patent Law Firm

(57) ABSTRACT

The present invention provides a multi-projection system including two or more projection devices which project images on a plurality of projection surfaces and a management device which manages the images projected by the two or more projection devices and controls the two or more projection devices, the two or more projection devices projecting synchronized images on the plurality of projection surfaces.

30 Claims, 4 Drawing Sheets

(56) References Cited

U.S. PATENT DOCUMENTS

| | | |
|---|---|---|
| 2007/0179646 A1 | 8/2007 | Dempski et al. |
| 2007/0211225 A1* | 9/2007 | Kondo ................. H04N 9/3147 353/94 |
| 2008/0281872 A1 | 11/2008 | Mizuno |
| 2009/0091714 A1* | 4/2009 | Aufranc ................. G03B 21/26 353/70 |
| 2009/0213337 A1 | 8/2009 | Kondo et al. |
| 2010/0309391 A1* | 12/2010 | Plut ..................... H04N 9/3117 348/756 |

FOREIGN PATENT DOCUMENTS

| | | |
|---|---|---|
| JP | 2000-122193 A | 4/2000 |
| JP | 2005-039788 A | 2/2005 |
| JP | 2007-147786 A | 6/2007 |
| KR | 10-2004-0107193 A | 12/2004 |
| KR | 10-1031062 B1 | 4/2011 |
| WO | 93/18496 A2 | 9/1993 |
| WO | 98/01841 A1 | 1/1998 |
| WO | 00/18138 A1 | 3/2000 |
| WO | 00/34825 A1 | 6/2000 |
| WO | 2006/056797 A1 | 6/2006 |
| WO | 2007/029997 A1 | 3/2007 |

OTHER PUBLICATIONS

KIPO Office Action for Korean Patent Application No. 10-2012-0130108.

* cited by examiner

MULTI-PROJECTION SYSTEM

CROSS-REFERENCE TO RELATED PATENT APPLICATION

This application claims the benefits of Korean Patent Applications No. 10-2012-0076100 filed on Jul. 12, 2012, No. 10-2012-0130108 filed on Nov. 16, 2012, in the Korean Intellectual Property Office, the disclosure of which is incorporated herein in its entirety by reference.

BACKGROUND OF THE INVENTION

1. Field of the Invention

The present invention relates to a multi-projection system and, more particularly, to a system which comprises two or more projection devices (e.g., projectors) for projecting images on a plurality of projection surfaces and a management device for controlling the two or more projection devices, thus providing audiences with a multi-projection environment.

2. Description of the Related Art

Conventionally, in order to reproduce images such as movies, advertisements, etc., two-dimensional images are projected on a single screen arranged in front of a theater.

FIG. 1 shows an example in which an image is reproduced in a conventional theater system in such a manner that a projector located at the rear of a theater projects the image on a single screen installed in front of the theater, thus providing audiences with the image. However, the audiences can only watch two-dimensional (2D) images under such a system.

Research on technologies for providing audiences with three-dimensional (3D) images has recently been conducted, and 3D image technologies such as 3D TVs, 3D theaters, etc. have been developed. 3D image technologies use the principle of allowing an audience to feel the 3D effect even from a flat image when different images are presented to the left and right eyes of the audience and combined in the brain. In detail, two cameras equipped with different polarizing filters are used during filming, and glasses equipped with polarizing filters are worn by the audience such that different images are presented to the left and right eyes during watching.

However, these 3D technologies can provide audiences with 3D images, but the audiences just watch the images reproduced on a single screen, which may reduce the involvement in the images. Moreover, the direction of the 3D effect that the audiences feel is limited to the direction of the single screen.

Furthermore, according to the conventional 3D technologies, the audiences must wear glasses equipped with polarizing filters during watching, which may make the audiences feel inconvenient, and different images are artificially presented to the left and right eyes, which may make some sensitive audiences feel dizzy or nausea.

Therefore, there is a need to develop a new projection system which can solve the problems of the conventional projection systems based on a single screen, provide audiences with images in various viewpoints, and increase the involvement and 3D effect that the audiences feel.

SUMMARY OF THE INVENTION

The present invention has been made in an effort to solve the above-described problems associated with prior art, and an object of the present invention is to provide a multi-projection system which projects synchronized images on a plurality of projection surfaces, thus providing audiences with a three-dimensional image.

To achieve the above object, a multi-projection system in accordance with an embodiment of the present invention may comprise: two or more projection devices which project images on a plurality of projection surfaces; and a management device which manages the images projected by the two or more projection devices and controls the two or more projection devices, wherein images which are synchronized with each other may be projected on the plurality of projection surfaces.

Here, the plurality of projection surfaces may be arranged so as not to be parallel to each other.

The two or more projection devices may project different images, and a single image may generally be reproduced on the plurality of projection surfaces.

The management device may correct images to be projected on the plurality of projection surfaces and transmit the corrected images to the two or more projection devices.

The management device may perform correction on each image projected by each projection device.

The management device may perform image warping correction, masking correction, or edge blending correction on the images projected by the two or more projection devices.

The image warping correction may set a keystone by moving any point to any position regardless of grid.

The management device may perform the masking correction on an image file and the two or more projection devices may not perform the masking correction during projection.

The management device may correct the image based on information on the projection surface on which each projection device projects the image.

The management device may correct the images, which are projected by the two or more projection devices, based on relative properties of the plurality of projection surfaces.

The management device may correct the image based on information on a structure installed on the projection surface of each projection device.

The management device may further comprise a storage unit which stores information on a projection environment, and the management device may use the information stored in the storage unit when correcting the image to be projected by each projection device.

The storage unit may store image correction profile information of each projection device.

The image correction profile information may comprise image warping correction information, edge blending correction information, or masking correction information.

The two or more projection devices may comprise: a projection device which projects a main image of digital cinema package (DCP) or digital screen advertising (DSA); and a projection device which projects an auxiliary image matched with the main image.

The management device may divide a single image of DCP or DSA and transmit the divided images to the two or more projection devices.

The management device may divide the image based on arrangement information of the plurality of projection surfaces or based on installation information of the two or more projection devices.

The plurality of projection surfaces may comprise a screen and a wall, and the management device may correct the images based on relative properties of the screen and the wall.

The management device may transmit a synchronization signal to the two or more projection devices, and the two or more projection devices may project images based on the synchronization signal transmitted from the management.

The management device transmits the synchronization signal based on time code information of DSA or DCP.

Meanwhile, according to a multi-projection system in accordance with another embodiment of the present invention, the management device may comprise: a plurality of auxiliary servers which control the two or more projection devices; and a main server which controls the plurality of auxiliary servers.

Here, the plurality of auxiliary servers may be controlled by the main server in a parallel manner.

Each of the plurality of auxiliary servers may control one or more projection devices.

The main server may correct the images to be projected by the two or more projection devices and transmit the corrected images to the plurality of auxiliary servers.

The main server may perform correction on each image projected by each projection device.

The main server may perform image warping correction, masking correction, or edge blending correction on the images projected by the two or more projection devices.

Each of the plurality of auxiliary servers may render the corrected image transmitted from the main server and then store the rendered image.

The main server may transmit a synchronization signal to the plurality of auxiliary servers, and the plurality of auxiliary servers may control the image projection operation of the projection devices connected thereto based on the received synchronization signal.

The image data projected by the two or more projection devices may be obtained by taking a single scene from two or more viewpoints.

The image data projected by the two or more projection devices may have a standard data format or standard size.

The management device may operate in connection with a DSA system, DCP system, or automation system built in a theater.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a multi-projection system in accordance with embodiments of the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Meanwhile, the term "comprising" specific components is an "open-ended term" that simply means that the corresponding components are present and should not be understood to exclude other additional components.

A multi-projection system in accordance with an embodiment of the present invention will be described with reference to FIGS. 2 to 6 below.

As will be described below, a multi-projection system refers to a projection system which reproduces images, which can be synchronized and unified with each other, on a plurality of projection surfaces placed around an audience, thus allowing the audience to experience a sense of reality as if he or she actually exists in a space depicted in the image.

Figure 1:
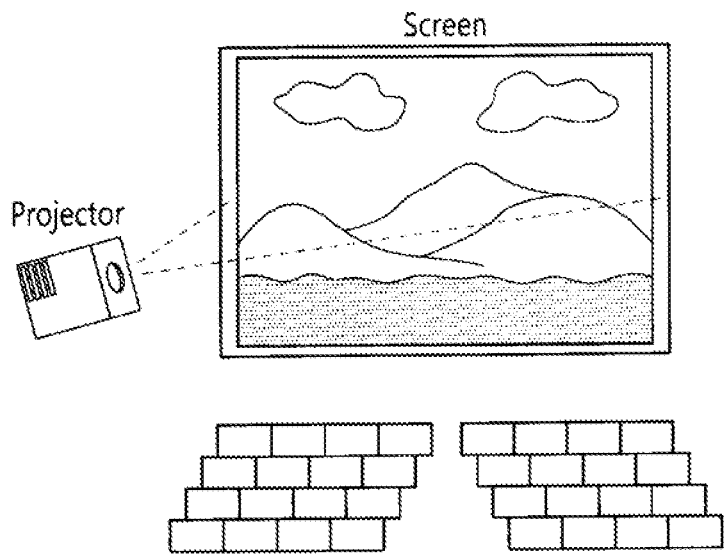
FIG. 1 is a diagram showing an example of a conventional projection system which reproduces an image.
Figure 2:
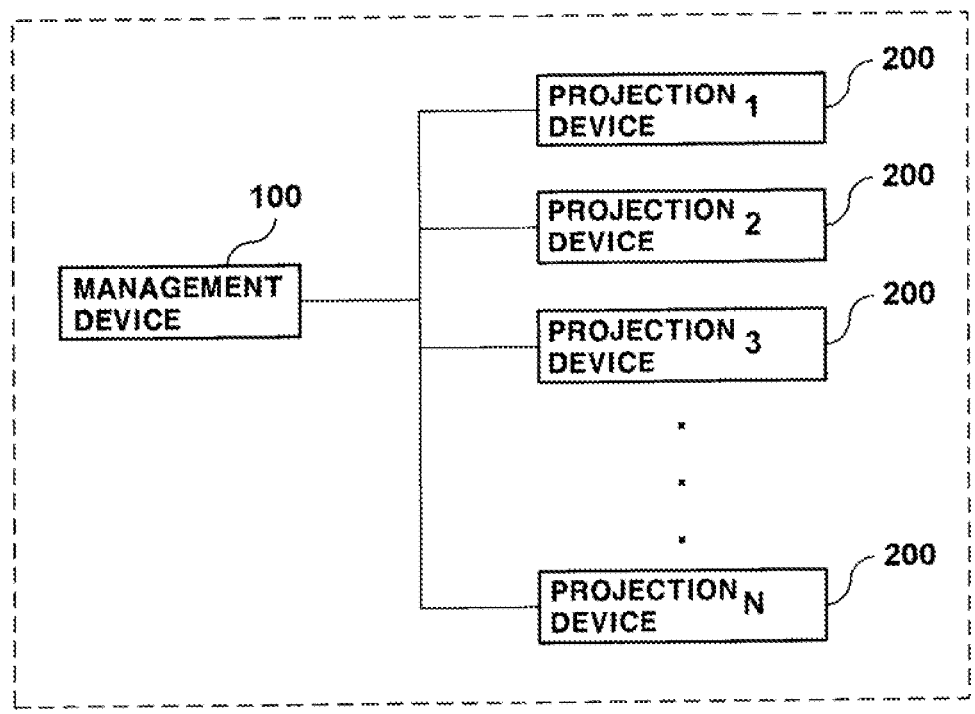
FIGS. 2 and 3 are diagrams showing the configuration of a multi-projection system in accordance with an embodiment of the present invention.
Figure 3:
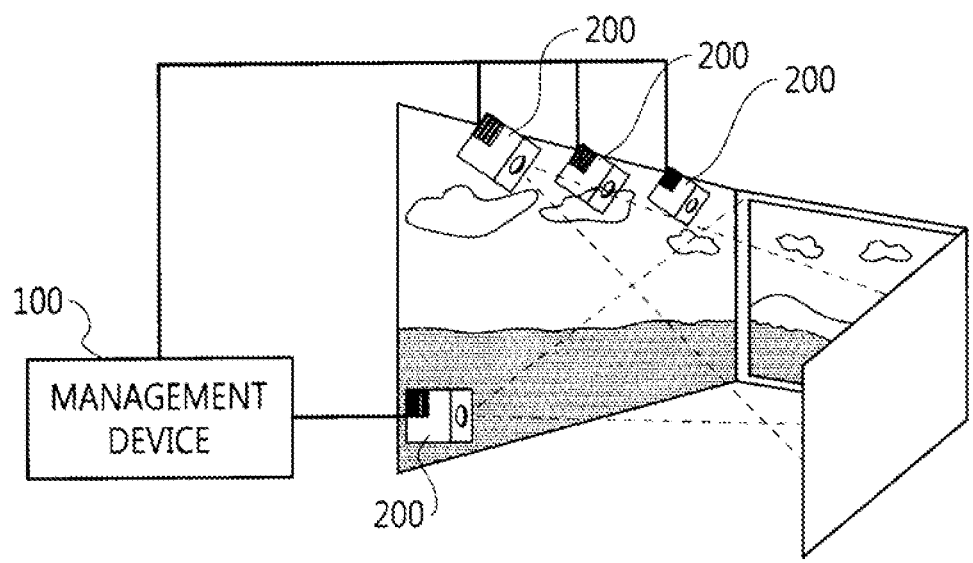

Referring to FIGS. 2 and 3, a multi-projection system in accordance with an embodiment of the present invention may comprise two or more projection devices 200 which project images on a plurality of projection surfaces and a management device 100 which manages the images projected by the two or more projection devices 200 and controls the projection operation of the two or more projection devices 200.

Moreover, the two or more projection devices 200 may project images synchronized with each other on the plurality of projection surfaces and reproduce images, which are synchronized and unified with each other, on the entire projection surface.

Here, it is preferable that a single unified image is reproduced on the entire projection surface (i.e., a part of the entire image is projected on each projection surface, and a single image is created on the entire projection surface), but an individual image may be displayed on each projection surface.

The plurality of projection surfaces serve as a screen of the multi-projection system. Images synchronized by the two or more projection devices 200 may be projected on the plurality of projection surfaces, and thus a unified image can be created on the entire projection surface.

Of course, different images may be displayed on the respective projection surfaces depending on the embodiment.

Meanwhile, the plurality of projection surfaces may be arranged so as not to be parallel to each other. According to the prior art, an image is projected only on a screen placed in front of a theater such that an audience watches the image reproduced on the two-dimensional screen or 3D technology is applied to the image itself reproduced on a plane. On the contrary, according to the present invention, the plurality of projection surfaces are three-dimensionally arranged so as not to be parallel to each other, and thus it is possible to provide the audience with a three-dimensional image with high 3D effect and involvement through the three-dimensionally arranged plurality of projection surfaces without applying the 3D technology to the image itself.

Moreover, it is preferable that the plurality of projection surfaces are arranged to surround an auditorium in the theater. Therefore, the audiences can feel as if they are in a space created by the unified image reproduced on the plurality of projection surfaces, and thus the three-dimensional effect, involvement, and virtual reality that the audiences feel can be maximized.

Furthermore, the angle between the plurality of projection surfaces is not limited to a specific angle, and the plurality of projection surfaces may be arranged at various angles as long as the audiences can feel the three-dimensional effect.

In addition, the plurality of projection surfaces may be arranged to be adjacent to each other or to be spaced from each other and, even in this case, it is preferable that the plurality of projection surfaces are arranged to surround the auditorium.

Figure 4:
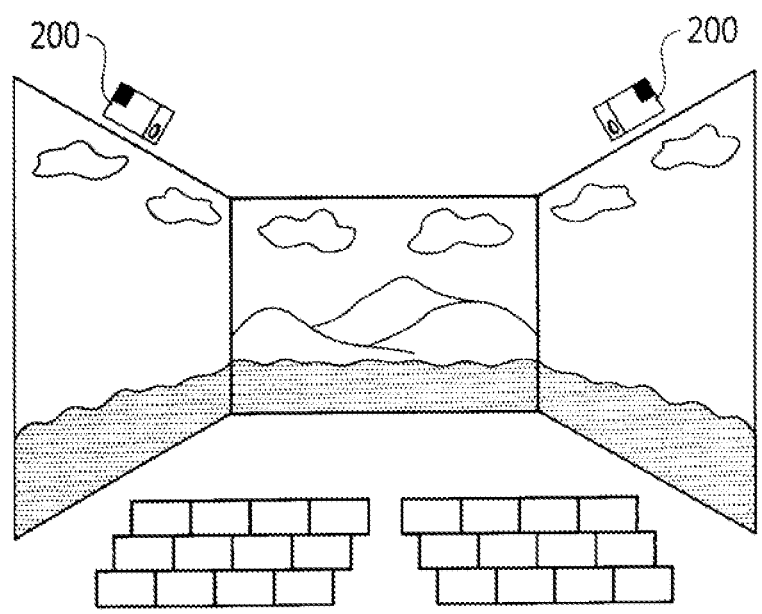
FIGS. 4 to 6 are diagrams showing examples of theaters to which the multi-projection system of the present invention is applied.
Figure 5:
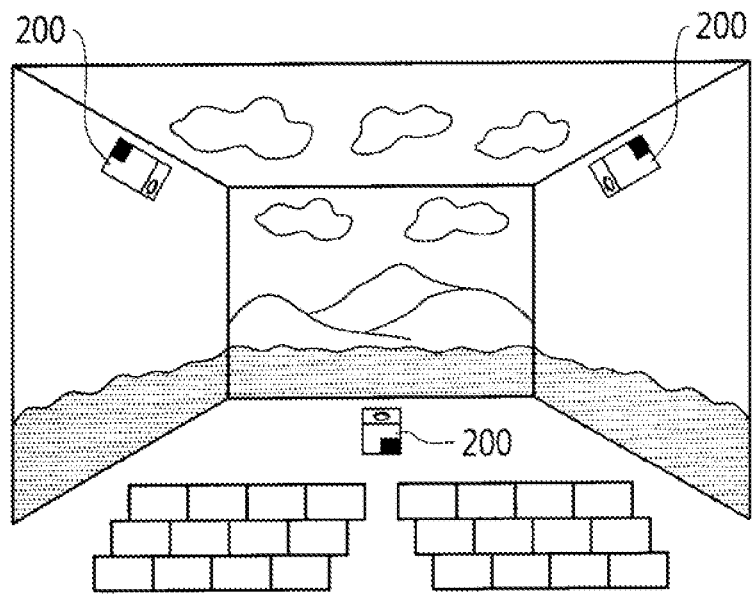
Figure 6:
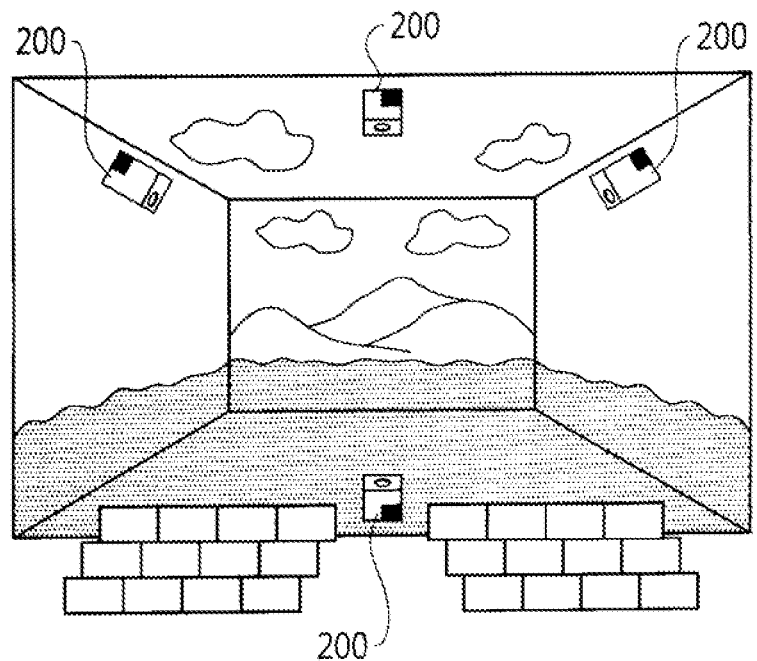

FIG. 4 is a diagram showing an example in which the plurality of projection surfaces are arranged on the front, left, and right sides with respect to the auditorium, FIG. 5 is a diagram showing an example in which the plurality of projection surfaces are arranged on the front, left, right, and top sides with respect to the auditorium, and FIG. 6 is a diagram showing an example in which the plurality of projection surfaces are arranged on the front, left, right, top, and bottom sides with respect to the auditorium.

Meanwhile, the plurality of projection surfaces may comprise different types of projection surfaces. For example, the plurality of projection surfaces may be configured in such a manner that a screen and a wall are mixed or different types of screens are mixed. Thus, the present invention is also applicable to a conventional theater comprising a single screen and a plurality of walls and can implement a multi-projection service even though a plurality of screens are not provided. However, in these environments, the unity of the images reproduced on the plurality of projection surfaces may be reduced due to heterogeneity (color, reflectivity, etc.) between the screen and the walls, but this problem can be overcome by image correction of the management device 100. In detail, the management device 100 may individually correct the images projected on the respective projection surfaces based on the relative properties (color, reflectivity, etc.) of the screen and the walls, thus creating a unified image on the entire projection surface. According to the present invention described above, the management device 100 corrects the images projected on the respective projection surfaces such that the color and reflectivity of the images presented on the entire projection surface are matched maximally with each other even though the types of the respective projection surfaces are different, and thus the audience cannot recognize that the plurality of projection surfaces are of different types while watching the images projected on the plurality of projection surfaces.

Moreover, the number of projection devices 200 which project images on the respective projection surfaces may differ depending on the size of each projection surface. For example, two or more projection devices 200 may project images together on a projection surface of a relatively large size, and a single projection device 200 may project an image on a projection surface of a relatively small size. Meanwhile, in the case where two or more projection devices project images on a single projection surface, the overlapping parts of the images projected by the respective projection device 200 may not be smooth, which can be solved by edge blending correction of the management device 100.

The two or more projection devices 200 refer to devices that project images on the plurality of projection surfaces. These projection devices 200 may have a heating unit such as an optical system, may project enlarged images on the projection surfaces, and may be implemented in various ways. For example, the projection devices 200 may be implemented by using a cathode ray tube (CRT), using a liquid crystal display (LCD), by digital light processing (DLP) using a digital micromirror device (DMD), etc.

Furthermore, the two or more projection devices 200 are installed in a distributed manner within the theater and the number of projection devices 200 installed may be greater than that of projection surfaces. This is because although a single projection device 200 basically projects an image on a single projection surface, in the case where the size of the projection surface is large, the two or more projection devices 200 project images together on divided areas of the single projection surface. Meanwhile, the number of projection devices 200 installed may be the same as or smaller than that of projection surfaces. If the number of projection devices 200 is smaller than that of the projection surfaces, a single projection device 200 projects an image on two or more projection surfaces at the same time.

In addition, the two or more projection devices 200 project images on the plurality of projection surfaces under the control of the management device 100. That is, the two or more projection devices 200 may project different images or the same image on the plurality of projection surfaces. Here, it is preferable that the images projected by the two or more projection devices 200 are synchronized with each other and, in the case where the two or more projection devices 200 project different images, it is preferable to create a unified image from the viewpoint of the entire projection surface (of source, separate images with no unity may be projected on the respective projection surfaces depending on the situations). Accordingly, the audiences can recognize the unified image in various directions of the respective projection surfaces through the images projected by the two or more projection devices 200, and the three-dimensional effect and involvement that the audiences feel can be increased by such recognition.

Meanwhile, the two or more projection devices 200 may be electrically connected to the management device 100 and integratedly controlled by the management device 100. Moreover, the two or more projection devices 200 may be connected in parallel to the management device 100 such that both an integrated control and an individual control are possible. In this case, the two or more projection devices 200 may be integratedly or individually controlled by the management device 100 to project images, which are synchronized and unified with each other, on the entire projection surface under these controls.

Moreover, the two or more projection devices 200 may receive images to project from the management device 100. In this case, each projection device 200 receives the images to be projected individually from the management device 100. Here, since each projection device 200 is responsible for a part of the entire unified image, different image may be transmitted to different projection devices 200. Furthermore, the reproduction of the images transmitted to the respective projection devices 200 may be integratedly controlled by the management device 100. For example, the reproduction of the images may be controlled in such a manner that the management device 100 transmits a synchronization signal to the two or more projection devices 200 and the two or more projection devices 200 project the images together based on the received synchronization signal. Meanwhile, the same image may be reproduced on the respective projection surfaces depending on the embodiment and, in this case, the same image data may be transmitted to the respective projection devices 200 under the control of the management device 100.

The management device 100, which is a device that generally manages the multi-projection system, manages a variety of information for implementing the system and controls the operation of various devices that may be included in the system. The management device 100 may be implemented with various electronic devices and may be implemented in a single electronic device or in such a manner that several electronic devices are interconnected. For example, the management device 100 may be implemented in a single server or in such a manner that two or more servers are interconnected.

Moreover, the management device 100 may be implemented in such a manner that a server and other electronic devices are interconnected or implemented in arithmetic units other than the server.

The management device 100 may manage the images projected by the two or more projection devices 200 and control the operation of the two or more projection devices 200. Moreover, the management device 100 may be connected in parallel to the two or more projection devices 200, thus controlling the respective projection devices 200 individually or integratedly.

The image management operation performed by the management device 100 will be described in detail. The image management operation may include image data preparation, image data correction, image data transfer, image reproduction management, etc.

The image data preparation refers to an operation in which the management device 100 prepares images for multi-projection. That is, the image data preparation refers to an operation in which the management device 100 prepares images to be projected by the respective projection devices 100 installed in a theater and includes an operation of matching specific image data with a specific projection device 200. The image data preparation may be made by various methods, and the following three methods will be described in brief.

First of all, the management device 100 may prepare image data in a manner to match image data specifically designed for multi-projection with the respective projection devices 200 installed in a theater. Here, the specifically designed image data refer to image data taken from various viewpoints for multi-projection (e.g., image data taken from a front viewpoint, image data taken from a left viewpoint, image data taken from a right viewpoint, image data taken from an upper viewpoint, and image data taken from a lower viewpoint) and include two or more image data depending on the types of viewpoints. Accordingly, the management device 100 can match the respective image data with the respective projection devices 200 based on viewpoint information of these image data and viewpoint information of the respective projection devices 200 and can prepare image data for multi-projection based on this operation.

Meanwhile, it is preferable that the specifically designed image data are created in a standard data format and in a standard size. This is because the standard data format and standard size will be of help in the image correction process later. For example, the specifically designed data are corrected based on information on the projections surfaces (such as the size, shape, color, material, reflectivity, etc.) or information on the projection devices (such as the resolution, brightness, distance to the projections surface, etc.) in the image data correction process later. If the specifically designed image data have the standard data format and size, the correction operation can be easily performed. In detail, a problem, which may occur when the image data is not standardized, in that it is necessary to a plurality of image correction solutions with respect to various data formats and sizes, a problem in that it is impossible to create an image appropriate for the projection surface with respect to a specific data format or size even by the image correction, etc. can be solved.

For reference, with respect to the image data correction based on shape information of the projection surfaces, the advantages of standardizing the specifically designed image data are as follows. The specifically designed images should be able to be reproduced in various types of multi-projection theaters having different types of projection surfaces and thus should be corrected based on the shapes of the projection surfaces arranged in each theater. Accordingly, when the specifically designed image data are standardized, the correction operation based on the shapes of the projection surfaces can be facilitated. In detail, the specifically designed image data should be able to be reproduced in various types of multi-projection theaters having various shapes of projection surfaces, such as a square shape, dome shape, shape with an inclined bottom, etc., and if the specifically designed image data are standardized, the operation of correcting the specifically designed image data to fit the shape of the each projection surface can be very easily performed (if the data format or size of the image is freely configured, basic data required for the image correction with respect to a projection surface of a specific shape may be insufficient, and thus an incomplete image may be reproduced).

Secondly, the management device 100 may prepare image data in a manner to divide single image data into a plurality of image data. In detail, the management device 100 may divide the single image data into a plurality of image data based on information on the number of projection devices 200 installed in a theater and position information and may prepare image data by matching the divided image data with the respective projection devices 200.

For example, if projection device (A) for projecting an image to a left projection surface, projection device (B) for projecting an image to a front projection surface, and projection device (C) for projecting an image to a right projection surface are provided in a multi-projection theater, the management device 100 may divide single image data into image data (a) to be projected to the left projection surface, image data (b) to be projected to the front projection surface, and image data (b) to be projected to the right projection surface. Moreover, the management device 100 may match the divided image data with the respective projection devices (A-a, B-b, and C-c) and prepare the image data through this process.

Thirdly, the management device 100 may prepare image data of the respective projection devices 200 in a manner to combine a plurality of auxiliary image data with single image data. In this case, the single image data is matched with a projection device 200 for a main projection surface, the auxiliary image data prepared by the management device 100 itself are matched with projection devices 200 for other projection surfaces. This third method is to project a main image from a single viewpoint on the main projection surface and project auxiliary images that can be integrated with the main image from a single viewpoint (e.g., background images that can be connected to the main unified image, images associated with the main image, etc.), thus providing the audiences with the three-dimensional effect and involvement.

Meanwhile, the management device 100 may receive the basic data (e.g., original image data, specifically designed image data, etc.) required to prepare the image data in various ways. For example, the management device 100 may receive the basic data from a storage medium or a system containing the basic data. Moreover, the management device 100 may receive the basic data through various networks or the internet.

The image data correction refers to an operation in which the management device 100 corrects the image data prior to the projection step so as to provide the audiences with an image with high involvement, 3D effect, and unity.

Here, the management device 100 does not correct all images projected by the two or more projection devices 200 in the same manner, but individually performs the correction on each image projected by each projection device 200. Moreover, the management device 100 performs the correction based on information on each projection device 200 in this correction process. In detail, the management device 100 performs the correction based on a variety of information related to each projection device 200, such as the model and resolution of the projection device 200, the brightness of the image projected by the projection device 200, the distance to the projections surface, the angle between the projection device 200 and the projection surface, the material, color, reflectivity of the projection surface, etc.

Examples of the image data correction with respect to each image data, projected by each projection device 200, performed by the management device 100 may include image warping correction, masking correction, edge blending correction, etc.

The image warping correction is a kind of geometric correction to set a keystone to fit the structure of the projection surface. The image warping correction may preferably be implemented in a manner to set the keystone by moving any point to any position regardless of grid, which can further facilitate the warping of the image.

Next, the edge blending correction allows the overlapping parts of the images to be naturally connected. Since the two or more projection devices 200 project different images, which form a single image as a whole, it is necessary to process the overlapping parts of the images projected by the respective projection devices 200 to be smooth. Accordingly, the overlapping parts of the images projected by the respective projection devices 200 can be processed to be smooth by the edge blending correction.

Next, the masking correction minimizes intervening factors occurring when the projected image is reflected on the auditorium. With respect to the masking correction, the present invention is characterized in that the management device 100 performs the masking correction on an image file and each projection device 200 does not perform the masking correction during projection.

Moreover, the management device 100 may correct the images projected by the respective projection devices 200 based on the relative properties of the projection surfaces on which the respective projection devices 200 project the images. Here, the relative properties of the projection surfaces may include the relative difference in material, the relative difference in reflectivity, the relative difference in color, etc. The relative difference in the properties of the projection surfaces may cause a difference in brightness, chroma, or color between the images reproduced on the respective projection surfaces, and this difference in brightness, chroma, or color may destroy the unity of the images given to the audiences and may reduce the audiences' involvement. Accordingly, the management device 100 recognizes the differences in brightness, chroma, and color, which may be caused by the relative difference in the properties of the projection surfaces, and corrects the images projected by the respective projection devices 200 in different manners based on these relative differences in brightness, chroma, and color. For example, if a specific projection surface reduces the brightness or chroma of the projected image compared to other projection surfaces, the reduced brightness or chrome is increased in the image correction process. Moreover, the difference in color of a specific projection surface may be offset by color correction. Meanwhile, these corrections are useful when the plurality of projection surfaces are of different types because the differences in the properties between the different types of projection surfaces are large.

Moreover, the management device 100 may correct the image, which will be projected by each projection device 200, based on surface information of each projection surface. A curved shape such as an uneven area may be formed or a structure may be installed on a part of the plurality of projection surfaces, and thus the projected image may be distorted on the uneven area or structure (e.g., speaker), which needs to be corrected. This is because the distortion of the image occurring by the uneven area or structure may reduce the audiences' involvement. Thus, the management device 100 may recognize the shape of the uneven area or structure formed on the corresponding projection surface based on the surface information of the projection surface, on which each projection device 200 projects the image, and reduce the distortion of the image, which may occur by the uneven area or structure, by reflecting the recognized shape on the geometric correction.

Meanwhile, the management device 100 may database information on a projection environment related to the image correction, store the information in a database, and perform the image correction using the database. Here, the databased information may include the material, color, reflectivity, and brightness of the projection surface, the model and resolution of the projection device, the brightness of the image projected by the projection device, the distance between the projections surface and the projection device, the structure installed on the projection surface, etc., as well as a variety of information that can be referred to in the image correction process.

Moreover, the management device 100 may database image correction profile information, which is matched with its projection environment and store the image correction profile information in a database. In this case, the image correction profile information may include image warping correction information, edge blending correction information, masking correction information, color correction information, bright correction information, chroma correction information, and other geometric correction information for the respective projection devices 200, and these image profile information may be divided for each projection device 200 and stored in the database. Accordingly, even when the image content to be reproduced in the multi-projection theater is changed, the management device 100 can perform the image correction using the database without inputting new information. Moreover, the management device 100 can generate a corrected image based on the databased correction profiles, even if any image is input, thus performing the correction and reproduction of the image at the same time.

Meanwhile, a variety of image profile information on various types (number of cases) of projection environments may be stored in the database of the management device 100. In detail, various types (number of cases) of projection environments and image correction profiles may be matched with each other and stored in the database. For example, the database of the management device 100 may store various types of projection environments and image profile information, which are matched with each other, such as an image correction profile for the case where the plurality of projection surfaces comprise an aluminum screen and a plaster wall, an image correction profile for the case where the difference in brightness between the projection devices is 500 ANSI Lumens, an image correction profile for the case where the plurality of projection surfaces comprise two tectum projection surfaces and one PVC projection surface, an geometric correction profile for the case where the projection surfaces have a trapezoidal shape, an image correction profile for the case where the projection surfaces have white and brown colors, an image correction profile for the case where a speaker is installed at a specific position of the projection surfaces, an image correction profile for the case where the difference in reflectivity between the projection surfaces is about 10%, etc. (for reference, the above-described examples are only a part of all types). In this case, the management device 100 may extract specific image profile information matched with its current projection environment from the database and correct the images using the extracted specific image profile information. Accordingly, in this embodiment, (1) even if the projection environment is changed, the management device 100 can easily perform the image correction on a new projection environment (by extracting an image correction profile matched with the new projection environment from the database) and (2) it is possible to standardize management devices installed in various multi-projection theaters (e.g., multi-projection theater A, multi-projection theater b, multi-projection theater C, etc.) and configure the management devices to be compatible with each other.

The image data transfer refers to an operation in which the management device 100 renders the corrected images and transfers them to the two or more projection devices 200. This image transfer may be made via wire or wirelessly and performed on the respective projection devices 200 in a parallel manner. Moreover, since the two or more projection devices 200 generally create a unified image, but individually project different images, the management device 100 transfers the images based on matching information of the respective image data.

The image reproduction management refers to an operation in which, after transferring the image data to the two or more projection devices 200, the management device 100 manages an operation in which the two or more projection devices 200 project the images to be reproduced. Here, the management device 100 may transmit a synchronization signal which is common to all projection devices 200 such that the respective projection devices 200 being in synchronization with each other can project the images. Accordingly, since the two or more projection devices 200 project the images based on the common synchronization signal, a synchronized image is projected on the plurality of projection surfaces, and thus a unified image is reproduced on the entire projection surface.

Meanwhile, when the image is reproduced, (1) the image may always be projected on all projection surfaces, or (2) the image may be projected on all projection surfaces only in a particular scene (e.g., the image may be reproduced only on a front projection surface and then reproduced on the plurality of projection surfaces in a particular scene). It is apparent that the management device 100 can provide various performances as described above using the synchronization signal.

Moreover, the synchronization signal transmitted from the management device 100 may be configured in various data formats including time information, and a time code itself, such as theater content (e.g., digital cinema package (DCP)) or advertisement content (e.g., advertisement image through digital screen advertising (DSA) system), may be used as the synchronization signal.

In particular, the management device 100 may control the image of DCP or DSA in units of frames and synchronize the image projection operation of the two or more projection devices 200 using the time code for each frame. Accordingly, it is possible to accurately synchronize the images projected on the plurality of projection surfaces by the synchronization control based on the time code for each frame.

Meanwhile, the image data preparation, the image data correction, the image data transfer, and the image reproduction management may be performed continuously or discontinuously. Accordingly, the image data preparation, the image data correction, and the image data transfer may be completed before the image reproduction or performed in real time during the reproduction of the images.

The multi-projection system in accordance with an embodiment of the present invention may create a unified image on the plurality of projection surfaces using various image contents.

First, the multi-projection system may create a unified image on the plurality of projection surfaces using image data specifically designed for multi-projection. Here, the specifically designed image data refer to image data taken from various viewpoints for multi-projection and include two or more image data depending on the types of viewpoints. For example, the specifically designed image data may include image data taken in a basic vector direction (from a viewpoint of a basic image) and image data taken in multiple directions (from viewpoints of peripheral images), which are not parallel to the basic vector direction, and the image data taken from various viewpoints are matched with the respective projection surfaces in the multi-projection system and reproduced. In detail, the image taken from the basic viewpoint is projected on a front main projection surface and the peripheral image taken in the right direction with respect to the basic viewpoint is projected on a right projection surface with respect to the main projection surface. Moreover, the peripheral image taken in the left direction with respect to the basic viewpoint is projected on a left projection surface with respect to the main projection surface.

Next, the multi-projection system may create a unified image on the plurality of projection surfaces by dividing a single viewpoint image such as DCP, DSA, etc. and using the divided image contents. In this case, the single viewpoint image is divided by the management device 100, the divided images are projected on the respective projection surfaces by the respective projection devices 200, and the divided images projected on the respective projection surfaces are combined on the entire projection surface, thus providing the audience with a unified image. Accordingly, a single image is synchronously produced on the plurality of projection surfaces surrounding the auditorium. Thus, although the original image content is a single viewpoint image, the corresponding image is produced to surround the audiences, and thus the audiences are provided with the involvement and unity. Meanwhile, in this case, the management device 100 may divide the image based on arrangement information of the plurality of projection surfaces or based on installation information of the two or more projection devices 200.

Next, the multi-projection system may combine a plurality of auxiliary images with a single viewpoint image such as DCP, DSA, etc. and create a unified image on the plurality of projection surfaces using the combined image content. In this case, the projection device, which projects an image on the main projection surface, projects the single viewpoint image, and the projection devices 200, which project images on the other projection surfaces, project the auxiliary images combined by the management device 100. Here, the auxiliary images may be matched with background images included in the single viewpoint image and may preferably be unified with the backgrounds of the single viewpoint images. Accordingly, the audiences can watch the main image from a single viewpoint, while being surrounded by the auxiliary images, thus feeling as if they are actually present in the scene of the image (for reference, the auxiliary images may preferably be unified with the background of the single viewpoint image, but not limited thereto, that is, the auxiliary image may be an individual image associated with the single viewpoint image).

Next, an example of the configuration of the management device 100 will be described with reference to FIG. 7.

Figure 7:
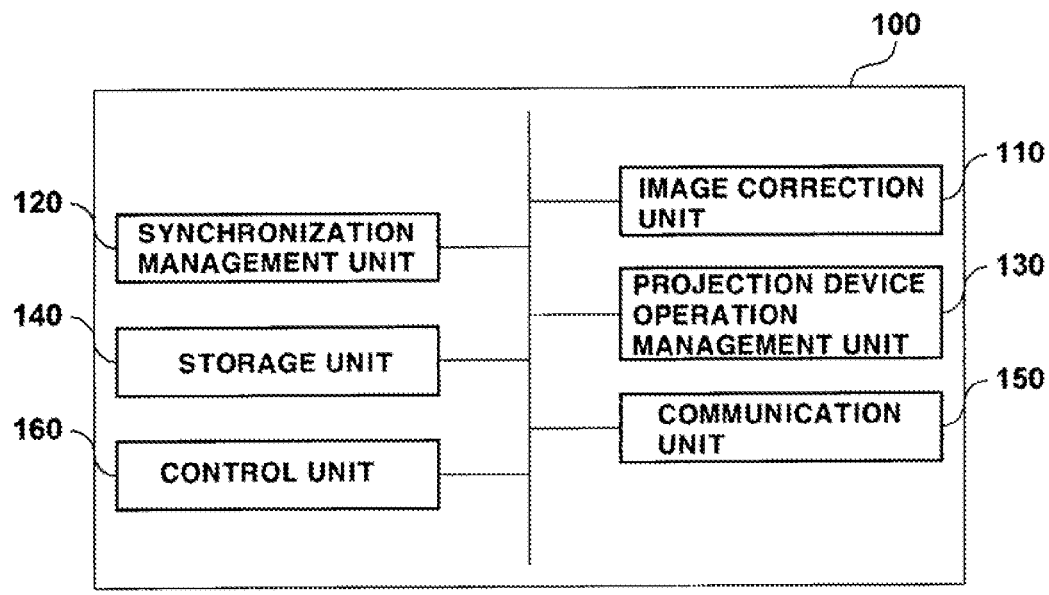
FIG. 7 is a diagram showing the configuration of a management device in accordance with an embodiment of the present invention.

Referring to FIG. 7, the management device may comprise an image correction unit 110, a synchronization management unit 120, a projection device operation management unit 130, a storage unit 140, a communication unit 150, and a control unit 160 as well as other elements for implementing the above-described operation of the management device.

The image correction unit 110 is responsible for the above-described image correction functions of the management device 100 and may be implemented in various image processing processes. The image correction unit 110 performs the above-described various image correction operations, and thus repetitive description will be omitted.

The synchronization management unit 120 synchronizes the image projection operation of the two or more projection devices 200. The synchronization management unit 120 generates a synchronization signal including time information and transmits the generated synchronization signal to the respective projection devices 200. Meanwhile, the respective projection devices 200, which receive the synchronization signal, project images based on the time information included in the synchronization signal, and thus all the projection devices 200 project a synchronized image. Accordingly, a unified image formed by the synchronized images is reproduced on the projection surfaces surrounding the auditorium, and thus the involvement and unity that the audiences feel can be increased. Meanwhile, the synchronization signal transmitted from the synchronization management unit 120 may be generated in various data formats and may be generated based on time code information included in a specific DCP or DSA.

The projection device operation management unit 130 controls the operation of the two or more projection devices 200 connected to the management device 100. In detail, the projection device operation management unit 130 may control various operations such as turning on/off of each projection device 200, controlling the direction, angle, etc. of image projection, etc. Meanwhile, it is preferable that the management device 100 and the two or more projection devices 200 are connected in parallel to each other, and thus the projection device operation management unit 130 can individually control each projection device 200 through the parallel connection.

The storage unit 140 stores a variety of information related to the multi-projection service and temporarily or permanently stores a variety of information related to the operation of the management device 100. For example, the storage unit 140 may store image data, individual information on each projection device 200, image correction profile information for various types (number of cases) of projection environments, information on each projection surface, synchronization signal information, etc.

The communication unit 150 allows the management device 100 to transmit and receive information to and from external devices. The communication unit 150 may be configured in various forms including wired or wireless communication networks and may be connected to various networks or the internet. Meanwhile, the management device 100 may transmit and receive a variety of information for the multi-projection service through the communication unit 150. For example, the management device 100 may receive image data such as DCP, DSA, etc. or transmit corrected images to the respective projection devices 200 through the communication unit 150. Moreover, the management device 100 may be connected to a user terminal device (such as a PC, notebook, etc.) through the communication unit 150 and controlled by a user's command.

The control unit 160 controls the operation of the image correction unit 110, the synchronization management unit 120, the projection device operation management unit 130, the storage unit 140, and the communication unit 150 as well as various operations of the management device 100.

Meanwhile, the management device 100 may be connected to various systems that may be built in the theater. In detail, the management device 100 may be connected to a DSA system, DCP system, automation system, etc., which may be built in the theater, through the communication unit 150 and may transmit and receive a variety of information through various protocols. Thus, the management device 100 can generally manage various systems built in the theater and may receive information required for the operation of the multi-projection system, if necessary.

Here, the DSA system refers to a system that manages a DSA image, a kind of advertisement image. The DSA system may preferably be configured in the form of a server and may be connected to the management device 100 to provide the DSA image to the management device 100.

Moreover, the DCP system refers to a system that manages a DCP image, a kid of movie image. The DCP system may preferably be configured in the form of a server and may be connected to the management device 100 to provide the DCP image to the management device 100.

Furthermore, the automation system refers to a system that control various electronic devices installed in the theater. In detail, the automation system generally controls the operation of a lighting device, a curtain device, an audio device, etc. which are installed in the theater. The automation system may preferably be configured in the form of a server and may be connected to the management device 100 to operate under the control of the management device 100.

Next, the configuration of a management device in accordance with another embodiment of the present invention will be described with reference to FIG. 8.

Figure 8:
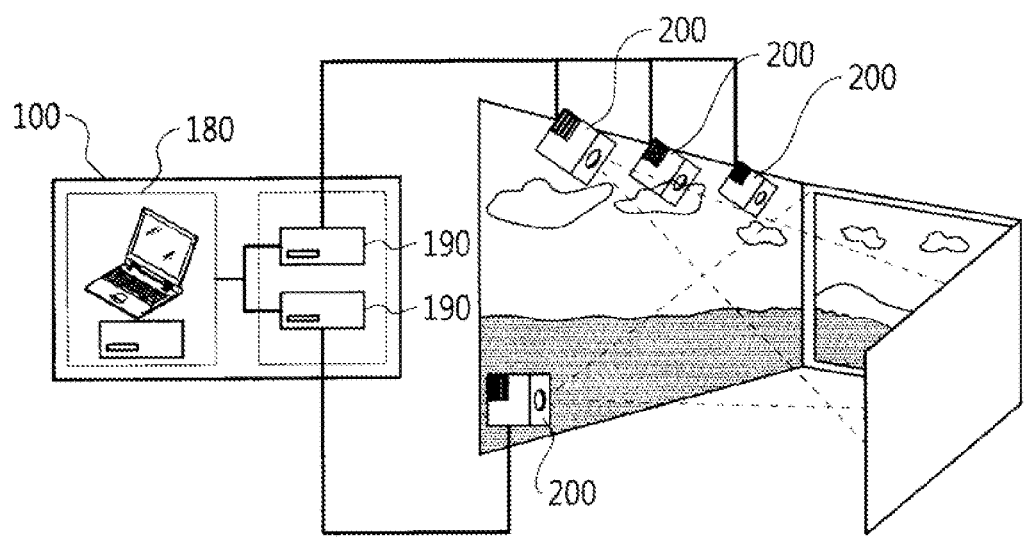
FIG. 8 is a diagram showing the configuration of a multi-projection system in accordance with another embodiment of the present invention.

Referring to FIG. 8, the management device 100 in accordance with another embodiment of the present invention may comprise a single main server 180 and a plurality of auxiliary servers 190, which are connected to each other.

In detail, the management device 100 may comprise a plurality of auxiliary servers 190 for controlling the two or more projection devices and a main server 180 for controlling the plurality of auxiliary servers 190.

In this embodiment, the control operation of the management device is hierarchically configured. In detail, the control operation of the management device may comprise (1) a first step of controlling, at the main server 180, the plurality of auxiliary servers 190 and (2) a second step of controlling, at the plurality of auxiliary servers 190, the projection device 200 connected to each auxiliary server 190. Meanwhile, it is preferable that the main server 190 and the plurality of auxiliary servers 190 are connected in parallel to each other, and thus the auxiliary servers 190 can be controlled in a parallel manner.

The main server 180 performs the above-described various operations of the management device such as the image data preparation, the image data correction, the image data transfer, the image reproduction management, etc.

However, the main server 180 does not directly transmit corrected image data to the respective projection device 200, but transmits the corrected image data to the respective auxiliary servers 190 for controlling the respective projection devices 200. Moreover, the main server 180 does not directly transmit a synchronization signal for synchronization of the respective images to the respective projection device 200, but transmits the synchronization signal to the respective auxiliary servers 190 for controlling the respective projection devices 200. That is, the main server 180 directly controls only the plurality of auxiliary servers 190, and the direct control of the two or more projection devices 200 is made by the auxiliary servers 190.

The plurality of auxiliary servers 190 may preferably be connected in parallel to the main server 180 and controlled by the main server 180 in a parallel manner. Moreover, each auxiliary server 190 is connected to one or more projection devices 200 and controls the one or more projection devices 200 connected.

The operation of each auxiliary server 190 is as follows. First, the auxiliary server 190 receives image data of the projection device 200 controlled by the auxiliary server 190 from the main server 180. Here, the received image data has been corrected by the main server 180, and the auxiliary server 190 renders the corrected image data and then stores the rendered data. Then, when receiving an image reproduction command is received together with the synchronization signal from the main server 180, the respective auxiliary servers 190 transmit the rendered images to the respective projection devices 200 connected thereto and control the respective projection devices 200 to project the images. Here, the respective auxiliary servers 190 control the operation of the respective projection devices 200 based on the received synchronization signal, and thus the images projected by the two or more projection devices 200 can be synchronized with each other.

As described above, the present invention can project and reproduce images on a plurality of projection surfaces, thus providing an audience with an image with high 3D effect and involvement.

Moreover, the present invention can provide the audience with a multi-viewpoint image by projecting synchronized images on the plurality of projection surfaces that surround an auditorium, thus allowing the audience to experience a sense of reality as if he or she actually exists in a space depicted in the image.

Furthermore, according to the present invention, the two or more projection devices, which project images on the plurality of projection surfaces, are integratedly managed and synchronized by a management device, and thus a synchronized and unified image can be reproduced on the entire projection surface.

In addition, according to the present invention, the images to be projected on the plurality of projection surfaces are not collectively corrected, but individually corrected for each projection device, and thus an optimized image can be reproduced on each of the plurality of projection surfaces arranged in the theater. In particular, when the image correction is individually performed on each projection device, it is possible to perform the image correction based on information on each projection device (such as, installation information, performance information, projection surface information, etc.), thus projecting an optimized image on each of the plurality of projection surfaces.

Additionally, the present invention can correct the respective images to be projected on the plurality of projection surfaces based on the relative properties of the plurality of projection surfaces. Thus, it is possible to reproduce images, which are synchronized and unified with each other, on the plurality of projection surface having different properties, and implement the multi-projection service even in a conventional theater comprising a single screen and a plurality of walls.

Moreover, the present invention can database image correction profile information of the respective projection devices installed in the theater, store the information in a database, and perform the image correction using the database. Thus, it is possible to implement the automation of the image correction process based on the databased information and perform the image correction without inputting new information event when the images to be reproduced are changed. Furthermore, it is possible to immediately generate a corrected image even if any image is input and perform the correction and reproduction of the image at the same time.

Furthermore, according to the present invention, even if the image content is not taken from multiple viewpoints, it is possible to implement the multi-projection service by inserting an auxiliary image matched with the corresponding image content or dividing the corresponding image content. For example, even when the image content (such as DCP, DSA, etc.) to be reproduced on the multi-projection system is a single viewpoint image displayed on a conventional single screen, it is possible to implement the multi projection service by inserting an auxiliary image matched with the background of the corresponding image or dividing the corresponding image content.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A multi-projection system installed in a theater, comprising:
   two or more projection devices which project images on a plurality of projection surfaces; and
   a management device which manages the images projected by the two or more projection devices and controls the two or more projection devices,
   wherein images which are synchronized with each other are projected on the plurality of projection surfaces, and
   wherein the two or more projection devices comprise:
   a projection device which projects a main image of digital cinema package (DCP) or digital screen advertising (DSA); and
   a projection device which projects an auxiliary image matched with the main image.

2. The multi-projection system of claim 1, wherein the plurality of projection surfaces are arranged to surround an auditorium.

3. The multi-projection system of claim 2, wherein the two or more projection devices project synchronized images and a single image is generally reproduced on the plurality of projection surfaces.

4. The multi-projection system of claim 1, wherein the management device corrects images to be projected on the plurality of projection surfaces and transmits the corrected images to the two or more projection devices.

5. The multi-projection system of claim 4, wherein the management device performs correction on each image projected by each projection device.

6. The multi-projection system of claim 5, wherein the management device performs image warping correction, masking correction, or edge blending correction on the images projected by the two or more projection devices.

7. The multi-projection system of claim 6, wherein the image warping correction sets a keystone by moving any point to any position regardless of grid.

8. The multi-projection system of claim 6, wherein the management device performs the masking correction on an image file and the two or more projection devices do not perform the masking correction during projection.

9. The multi-projection system of claim 5, wherein the management device corrects the image based on information on the projection surface on which each projection device projects the image.

10. The multi-projection system of claim 9, wherein the management device corrects the images, which are projected by the two or more projection devices, based on relative properties of the plurality of projection surfaces.

11. The multi-projection system of claim 9, wherein the management device corrects the image based on information on a structure installed on the projection surface of each projection device.

12. The multi-projection system of claim 4, wherein the management device further comprises a storage unit which stores information on a projection environment, and the management device uses the information stored in the storage unit when correcting the image to be projected by each projection device.

13. The multi-projection system of claim 12, wherein the storage unit stores image correction profile information of each projection device.

14. The multi-projection system of claim 13, wherein the image correction profile information comprises image warping correction information, edge blending correction information, or masking correction information.

15. The multi-projection system of claim 1, wherein the management device divides a single image of DCP or DSA and transmits the divided images to the two or more projection devices.

16. The multi-projection system of claim 15, wherein the management device divides the image based on arrangement information of the plurality of projection surfaces or based on installation information of the two or more projection devices.

17. The multi-projection system of claim 1, wherein the plurality of projection surfaces comprise a screen and a wall, and the management device corrects the images based on relative properties of the screen and the wall.

18. The multi-projection system of claim 1, wherein the management device transmits a synchronization signal to the two or more projection devices, and the two or more projection devices project images based on the synchronization signal transmitted from the management.

19. The multi-projection system of claim 18, wherein the management device transmits the synchronization signal based on time code information of DSA or DCP.

20. A multi-projection system installed in a theater, comprising:
two or more projection devices which project images on a plurality of projection surfaces; and
a management device, which manages the images projected by the two or more projection devices and controls the two or more projection devices,
wherein images which are synchronized with each other are projected on the plurality of projection surfaces, and
wherein the management device comprises:
a plurality of auxiliary servers which control the two or more projection devices; and
a main server which controls the plurality of auxiliary servers.

21. The multi-projection system of claim 20, wherein the plurality of auxiliary servers are controlled by the main server in a parallel manner.

22. The multi-projection system of claim 21, wherein each of the plurality of auxiliary servers controls one or more projection devices.

23. The multi-projection system of claim 20, wherein the main server corrects the images to be projected by the two or more projection devices and transmits the corrected images to the plurality of auxiliary servers.

24. The multi-projection system of claim 23, wherein the main server performs correction on each image projected by each projection device.

25. The multi-projection system of claim 24, wherein the main server performs image warping correction, masking correction, or edge blending correction on the images projected by the two or more projection devices.

26. The multi-projection system of claim 23, wherein each of the plurality of auxiliary servers renders the corrected image transmitted from the main server and then stores the rendered image.

27. The multi-projection system of claim 20, wherein the main server transmits a synchronization signal to the plurality of auxiliary servers, and the plurality of auxiliary servers control the image projection operation of the projection devices connected thereto based on the received synchronization signal.

28. The multi-projection system of claim 1, wherein the image data projected by the two or more projection devices are obtained by taking a single scene from two or more viewpoints.

29. The multi-projection system of claim 28, wherein the image data projected by the two or more projection devices have a standard data format or standard size.

30. The multi-projection system of claim 1, wherein the management device operates in connection with a DSA system, DCP system, or automation system built in a theater.

* * * * *